(12) United States Patent
Coleman et al.

(10) Patent No.: US 8,040,099 B2
(45) Date of Patent: Oct. 18, 2011

(54) POSITION DEVICE IN GANTRY TYPE OF CONSTRUCTION

(75) Inventors: Ralph Coleman, Fleurier (CH); Laurent Heiniger, Fontainemelon (CH)

(73) Assignee: Etel S.A., Motiers (CH)

( * ) Notice: Subject to any disclaimer, the term of this patent is extended or adjusted under 35 U.S.C. 154(b) by 345 days.

(21) Appl. No.: 12/440,855

(22) PCT Filed: May 11, 2007

(86) PCT No.: PCT/EP2007/004175
§ 371 (c)(1),
(2), (4) Date: Jun. 15, 2009

(87) PCT Pub. No.: WO2008/034475
PCT Pub. Date: Mar. 27, 2008

(65) Prior Publication Data
US 2010/0066298 A1    Mar. 18, 2010

(30) Foreign Application Priority Data
Sep. 20, 2006  (DE) .......................... 10 2006 044 358

(51) Int. Cl.
*G05B 1/06* (2006.01)
(52) U.S. Cl. ..... 318/652; 318/565; 318/687; 52/651.05; 212/324; 409/202; 409/212; 702/95

(58) Field of Classification Search ................. 318/652, 318/565, 687; 52/651.05; 212/324; 409/202, 409/212; 702/95
See application file for complete search history.

(56) References Cited

U.S. PATENT DOCUMENTS

| 4,587,622 | A | 5/1986 | Herzog |
| 6,949,733 | B2 | 9/2005 | Widdowson et al. |
| 7,610,162 | B2 * | 10/2009 | Grupp ............................. 702/95 |
| 2004/0178327 | A1 | 9/2004 | Widdowson et al. |
| 2009/0287444 | A1 * | 11/2009 | Ishikawa ......................... 702/95 |
| 2009/0326849 | A1 * | 12/2009 | MacManus ..................... 702/95 |

FOREIGN PATENT DOCUMENTS

| DE | 42 12 970 | 10/1993 |
| DE | 10 2005 023 984 | 11/2006 |
| EP | 0 082 441 | 6/1983 |

OTHER PUBLICATIONS

International Search Report, PCT/EP2007/004175, dated Sep. 14, 2007.

\* cited by examiner

*Primary Examiner* — Walter Benson
*Assistant Examiner* — Erick Glass
(74) *Attorney, Agent, or Firm* — Kenyon & Kenyon LLP

(57) ABSTRACT

In a positioning device in gantry type of construction, due to a special arrangement of the position-measuring devices used for the positioning, errors due to thermal expansion of the positioning device may be avoided to a great extent. In particular, attention is given to the advantageous placement of fixed point of a scale relative to a straightness track of a further scale.

8 Claims, 2 Drawing Sheets

POSITION DEVICE IN GANTRY TYPE OF CONSTRUCTION

FIELD OF THE INVENTION

The present invention relates to a positioning device in gantry type of construction. Positioning devices of this sort are used in many areas of technology.

BACKGROUND INFORMATION

Positioning devices in gantry type of construction—in which a crossbeam is movably supported between two parallel linear guides, and a functional element is movably supported on the crossbeam with the aid of a further linear guide, so that this functional element may be freely positioned in a plane between the two parallel linear guides—have been in the state of the art for a long time. For example, a gripper of an automatic pick-and-place machine, a laser of a laser machining center, or perhaps a probe system of a coordinate measuring machine are possible as a functional element.

In all these practical applications, of which there are still more for gantry-type positioning devices, the most precise possible positioning of the functional element plays a crucial role. Therefore, often a great effort is expended to position the functional element as accurately as possible using the most precise position-measuring devices possible.

Position-measuring devices made up of scales having assigned scanning heads are based on the scanning of periodic structures on the scale. If the scale and the scanning head move relative to each other, the scanning head generates periodic signals, from which it is possible to derive the relative shift. In this context, the structures on the scale may also be implemented such that absolute position information is able to be read. This is managed either with reference marks or with absolutely coded tracks on the scale. Such position-measuring devices are used extensively in the realm of positioning devices, so that a more precise description of the functioning method is unnecessary.

For positioning devices in gantry type of construction, both European Patent No. 0 082 441 and U.S. Pat. No. 6,949,733 recommend the use of position-measuring devices based on the scanning of graduations disposed on a scale. Besides bearing the customary incremental track having a great number of graduated scale lines disposed transversely to the measuring direction (hereinafter referred to as a measuring track), the scales also bear an additional measuring structure having graduated scale lines in the measuring direction which are a few, but instead extend over the entire measuring length (hereinafter referred to as a straightness track). Because of the possibility of deriving small position deviations transversely to the actual measuring direction from this straightness track, such scales are also known as 1D± scales. In both documents mentioned above, such 1D± scales are used to measure guiding errors and tilts and to take them into consideration in the positioning. In part, errors are also taken into account which are of the sort that come about due to thermal expansion of individual components of the positioning device. However, it is not possible to completely measure and compensate for the thermal expansion of the crossbeam using any of the arrangements indicated in these documents. It is precisely this crossbeam, however, which is usually especially affected by such expansions when, for example, the transverse axis is driven by a linear motor that is disposed on the crossbeam, and whose waste heat heats up the crossbeam.

The crossbeam with linear guide is also denoted hereinafter as transverse guide.

1D± scales and measuring devices based on them are described in greater detail in German Published Patent Application No 10 2005 023 984.

In addition, it is described in German Published Patent Application No. 42 12 970 that, to compensate for thermal expansions when measuring a position, it is important to skillfully select the fixed point of a scale which is otherwise float-mounted, e.g., mounted movably on its substrate with the aid of a flexible adhesive layer. At this fixed point, the scale is firmly joined to its support, so that the scale is moved along in response to thermal displacement of this fixed point.

SUMMARY

Example embodiments of the present invention provide a positioning device in gantry type of construction, in which the influence of the thermal expansion of the transverse guide on the positioning of the functional element is able to be determined and offset.

According to example embodiments of the present invention, a positioning device in gantry type of construction includes:

- two parallel linear guides extending in a first direction, each of which supports an X-traveling carriage in a manner allowing displacement in the first direction,
- a transverse guide, extending substantially in a second direction perpendicular to the first direction, which is attached to the two X-traveling carriages and supports a Y-traveling carriage in a manner allowing displacement in the second direction,
- a functional element attached to the Y-traveling carriage thereby being able to be positioned in a working area between the two linear guides extending in the first direction,
- at least one X-position-measuring device including a scale and an assigned scanning head for determining the position of the transverse guide in the first direction,
- a Y-position-measuring device including a scale and an assigned scanning head for determining the position of the Y-traveling carriage on the transverse guide, the scale of the Y-position-measuring device being attached to the transverse guide, and the assigned scanning head being attached to the Y-traveling carriage,
- a scale extending longitudinally in the first direction, which has a straightness track, for measuring displacements of the transverse guide in the second direction with the aid of a scanning head, attached to the transverse guide, for scanning the straightness track,
- the scale of the Y-position-measuring device being joined to the transverse guide such that it is firmly joined to the transverse guide at a fixed point in terms of the second direction,
- and this scale of the Y-position-measuring device otherwise being joined to the transverse guide in floating fashion in terms of the second direction,
- and the fixed point being perpendicularly offset with respect to the straightness track in terms of the first and second direction,
- so that a thermal displacement of the fixed point is completely detected by the scanning of the straightness track.

The scale, extending longitudinally in the first direction, with straightness track, may be formed concretely or virtually, just like its assigned scanning head. Virtually formed in this context means that position values are derived from two real position-measuring devices, each having a scale with straightness track and associated scanning head, and combined to form a single position value, which may then be used as measured value of the virtual position-measuring device.

Using such an arrangement of the position-measuring devices in respect to the gantry-type positioning device, it is possible to detect and compensate for the effect of the thermal expansion of the transverse guide on the positioning of the functional element.

Further features and aspects of example embodiments of the present invention and details pertaining thereto are described in the following description with reference to the figures.

DETAILED DESCRIPTION

Figure 1:
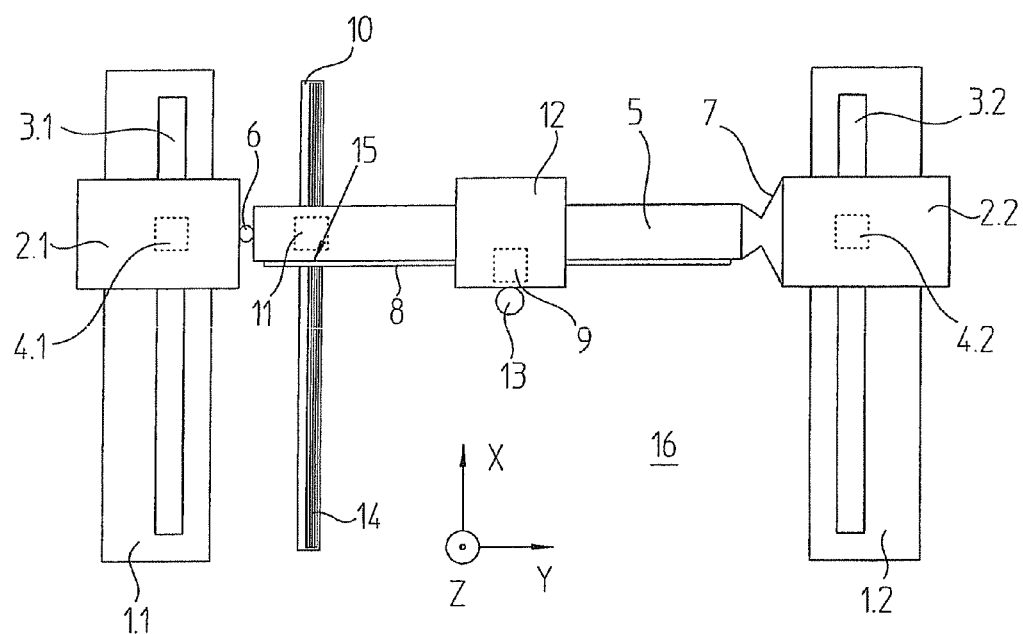
FIG. 1 is a plan view of a first positioning device.

FIG. 1 shows a first positioning device in gantry type of construction. Two linear guides 1.1, 1.2, disposed parallel to each other and extending in a first direction X, each support a traveling carriage 2.1, 2.2 in a manner allowing displacement in first direction X. In order to be able to distinguish traveling carriages 2.1, 2.2 linguistically from other traveling carriages, hereinafter they are also denoted as X-traveling carriages 2.1, 2.2.

Situated between the two X-traveling carriages 2.1 and 2.2 is a transverse guide 5 which extends substantially perpendicular to first direction X in a second direction Y. On this transverse guide 5, a further traveling carriage 12 is retained in a manner allowing displacement in second direction Y, so that hereinafter, this second traveling carriage 12 is also referred to as a Y-traveling carriage 12.

Transverse guide 5 is joined to one of the two X-traveling carriages 2.1 via a linkage joint 6 which only allows a swivel about the Z-axis of the linkage joint, but no movement in second direction Y. On the other hand, a flexible coupling 7 of transverse guide 5 to second X-traveling carriage 2.2 allows such a movement in second direction Y.

A functional element 13 attached to Y-traveling carriage 12 is thus able to be positioned in a working area between the two linear guides 1.1, 1.2 extending in the first direction.

Many different devices may be used as functional element 13. In addition to tools for gripping, machining or measuring, it may also be a table, secured on Y-traveling carriage 12, with whose aid an object to be machined is positioned. A further axis in a third direction Z may be used to move the functional element in a direction perpendicular to the X-Y machining plane.

To permit exact positioning of functional element 13, various position-measuring devices are necessary in both directions X, Y. Hereinafter, distinction is made between X-position-measuring devices and Y-position-measuring devices according to the respective measuring direction.

FIG. 1 shows two X-position-measuring devices, made up of scales 3.1 and 3.2, respectively, applied on linear guides 1.1 and 1.2, respectively, as well as scanning heads 4.1 and 4.2 assigned to scales 3.1 and 3.2. Scanning heads 4.1, 4.2 are integrated into X-traveling carriages 2.1, 2.2. The two X-position-measuring devices are used for determining the position of the two X-traveling carriages 2.1, 2.2, and consequently for determining the position of transverse guide 5, which is attached to the two X-traveling carriages 2.1, 2.2.

Between transverse guide 5 and Y-traveling carriage 12, a further position-measuring device is mounted, which is used for determining the position of the Y-traveling carriage in second direction Y. This measuring device, also referred to hereinafter as a Y-position-measuring device, is made up of a scale 8 attached to transverse guide 5, and a scanning head 9, integrated in Y-traveling carriage 12, for scanning scale 8.

If the positions of X-traveling carriages 2.1, 2.2, and therefore of transverse guide 5 and of Y-traveling carriage 12 are controlled using corresponding controllers, then Y-traveling carriage 12 and consequently functional element 13 are able to be moved into any desired setpoint position within the working area. To that end, e.g., linear motors (not shown in greater detail) are integrated or mounted as drive in linear guides 1.1 and 1.2 and in transverse guide 5.

A further scale 10, which is disposed extending longitudinally in first direction X, parallel to and between linear guides 1.1, 1.2, bears a straightness track 14 for measuring displacements of transverse guide 5 in second direction Y. To that end, a corresponding scanning head 11 for scanning straightness track 14 is attached to transverse guide 5. Scale 10 itself is connected to machine base 16, and therefore is disposed at the "thermal zero point" of the positioning device.

At this point, it should be mentioned that at least one X-position-measuring device must be provided for measuring the position of transverse guide 5 in first direction X. Any of the three scales 3.1, 3.2, 10 shown in FIG. 1 and extending in first direction X may be used for this purpose if it bears a suitable track. In particular, scale 10, in addition to its straightness track 14, could bear a measuring track for first measuring direction X. This scale 10 would then be a 1D± scale described above. Ultimately, the configuration used to measure the position of transverse guide 5 in first direction X is a function of the specific circumstances and requirements, and in particular is not important for the present invention. Straightness track 14 of scale 10 is exclusively decisive for realizing example embodiments of the present invention.

Scale 8 of the Y-measuring device is attached to transverse guide 5 such that it is firmly joined to transverse guide 5 at a fixed point 15 with respect to second direction Y. Otherwise, this scale 8 is retained "in a floating manner" in second direction Y, thus, for example, is retained via a flexible adhesive layer on the transverse guide. The result is that scale 8 is moved along as a whole with fixed point 15 in the event it is shifted relative to machine base 16, e.g., due to thermal expansion of transverse guide 5. Scale 8 itself, which in this exemplary embodiment is made of a material having a negligible expansion coefficient (such as Zerodur, for example) does not change in length. Due to the floating attachment, no stresses develop between transverse guide 5 and scale 8.

To allow complete compensation for the effect of thermal changes in length of transverse guide 5, fixed point 15 is placed such that, in the plan view of FIG. 1, it coincides with straightness track 14, regardless of the position of crossbeam or transverse guide 5 in first direction X. Namely, in a machine-specific coordinate system X, Y, Z, fixed point 15 and straightness track 14 have the same Y-position, while the Z-coordinate is different. Straightness track 14 extends so far in first direction X that every possible X-position of transverse guide 5 and therefore of scanning head 11 is covered. In FIG. 1, fixed point 15 lies perpendicularly above the straightness track relative to first and second directions X, Y. A perpendicular dropped through fixed point 15 to a plane defined by first and second directions X, Y intersects straightness track 14, regardless of the X-position and the thermal expansion of transverse guide 5.

This configuration of fixed point 15 and straightness track 14 ensures that the position signal scanned by scanning head 11 of straightness track 14 exactly represents the displacement of fixed point 15. Since scale 8 of the Y-position-measuring device itself does not expand, it is sufficient to correct the measurement of the Y-position-measuring device by the value—scanned by the scanning head of straightness track 14—of the displacement of fixed point 15, in order to obtain a corrected position value in second direction Y free of all (thus also of thermal) displacements of transverse guide 5 relative to machine base 16. Thus, the Y-traveling carriage may be positioned exactly relative to the machine base, regardless of a heating of transverse guide 5.

Figure 2:
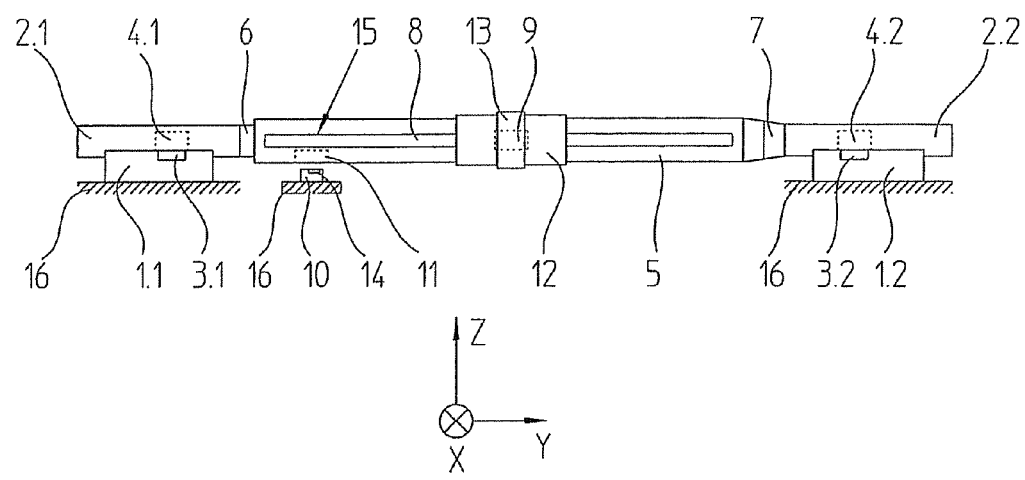
FIG. 2 is a side view of the first positioning device.

FIG. 2 shows a side view of the positioning device shown in FIG. 1, which is intended to clarify once again the placement of thermal fixed point 15 above straightness track 14. In this context, "above" means a different Z-coordinate, given consistent X- and Y-coordinates. Fixed point 15 therefore lies perpendicularly offset to straightness track 14 with respect to first and second directions X, Y. As can be seen in FIGS. 1 and 2, scanning head 11 for scanning straightness track 14 is also perpendicularly offset to straightness track 14 with respect to first and second directions X, Y. The scanning head 11 and fixed point 15 may by be offset relative to each other both in first direction X and in third direction Z.

Figure 3:
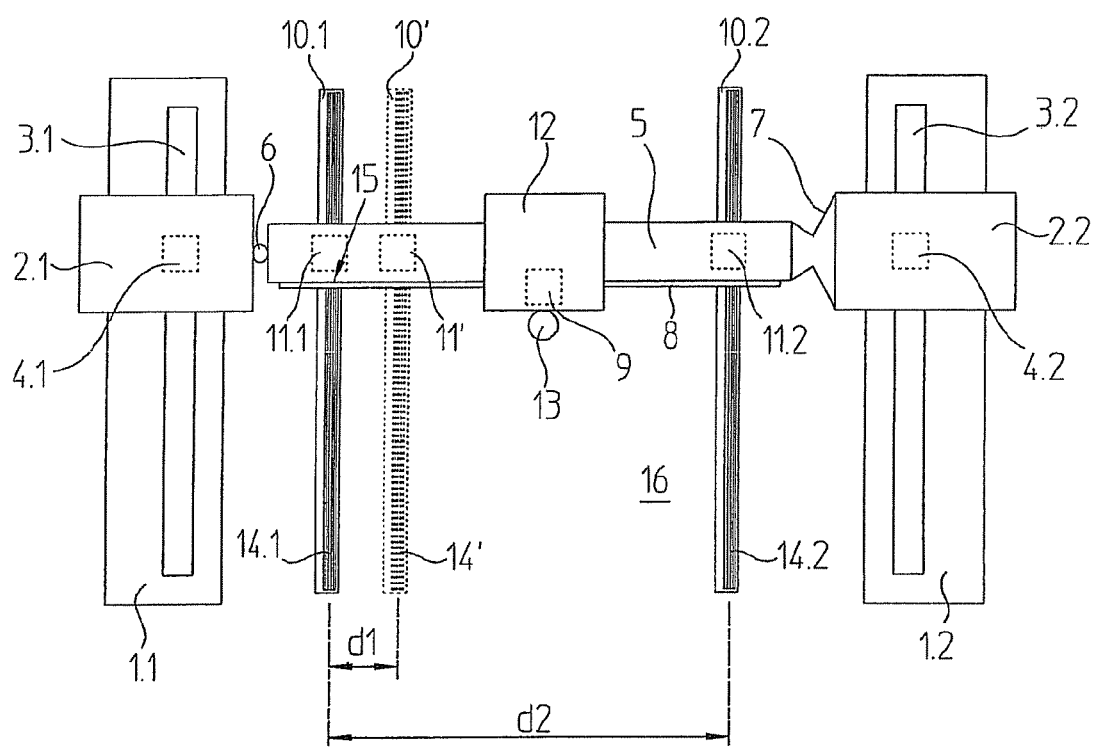
FIG. 3 is a plan view of a second positioning device.

FIG. 3 represents a further possibility using scales having straightness tracks. The arrangement of the positioning device corresponds to a great extent to the arrangement shown in FIG. 1. Therefore, identical components are designated by the same reference numerals.

According to this exemplary embodiment, there are two scales 10.1 and 10.2, each having a straightness track 14.1, 14.2, which are scanned by scanning heads 11.1, 11.2, respectively, attached to transverse guide 5. The two scales 10.1, 10.2 are again extended longitudinally parallel to and between the two linear guides 1.1 and 1.2.

Therefore, the possibility exists to detect the thermal displacements of transverse guide 5 at two locations set apart in second direction Y.

It may be that the movement of fixed point 15, at which scale 8 is joined to transverse guide 5, cannot be measured directly, since fixed point 15 is not situated above one of straightness tracks 14.1, 14.2 as in the first exemplary embodiment. However, this movement of fixed point 15 may be derived from the measurements at the two straightness tracks 14.1, 14.2.

The two scales 10.1, 10.2 together with straightness tracks 14.1, 14.2 are used to calculate a measured value of a virtual position-measuring device whose virtual straightness track 14' is completely below fixed point 15, as in the first exemplary embodiment, and which therefore again supplies the offset of fixed point 15. Such a system, in which a measured value of a single virtual position-measuring device is derived from two position-measuring devices, is also referred to as a "phantom scale" system. Virtual scale 10' thus taken into account and its virtual scanning head 11' correspond to real existing scale 10 and real existing scanning head 11 of FIGS. 1 and 2. The first and second exemplary embodiments are therefore similar.

For the position value derived from virtual scale 10', i.e., from its virtual straightness track 14', and therefore for displacement dy of fixed point 15 to be corrected, the following applies:

$$dy = y1*(1-d1/d2) + y2*d1/d2$$

where y1 and y2 are the two displacements of transverse guide 5 in second direction Y derived from scanning heads 11.1 and 11.2, d1 is the distance of fixed point 15 from straightness track 14.1, from which y1 is derived, and d2 is the spacing of the two straightness tracks 14.1 and 14.2. Offset dy to be corrected is therefore a weighted average from the two displacements y1, y2 read from scales 10.1, 10.2.

The corrected position of Y-traveling carriage 12 is then the position read off from scale 8 with the aid of scanning head 9, minus displacement dy of fixed point 15.

The formula for dy indicated above holds true when transverse guide 5 expands sufficiently uniformly over its entire length, that is, heats up uniformly over its entire length. This assumption holds true quite well for a transverse guide 5 made of aluminum because of the good thermal conductivity of aluminum.

If the two scales 10.1 and 10.2 are implemented as 1D± scales, thus in addition to having straightness tracks 14.1 and 14.2, they also have measuring tracks for first direction X, then these scales 10.1 and 10.2 may completely replace scales 3.1, 3.2 applied on linear guides 1.1, 1.2. The number of scales extending in first direction X may thus be reduced compared to the first exemplary embodiment, all necessary information nevertheless being available.

In particular, as in the first exemplary embodiment as well, a slight tilting of transverse guide 5 about axis of rotation or linkage joint 6 may be detected and set to a desired value. Such a tilting by a few degrees (limited by flexible coupling 7) may possibly even be advantageous, for instance, when functional element 13 is a table on which, on one hand, an object is able to be positioned in the first and second direction, and a rotation by a few degrees is adjustable as a further degree of freedom. Thus, for example, a silicon wafer placed rotated on the table may be aligned with respect to first and second directions X, Y.

When a positioning device of the type described here is switched on, it is necessary to first of all determine where fixed point 15 is currently located relative to straightness track 14. A value stored during the last shutdown may possibly no longer be correct, since the temperature of transverse guide 5 may have changed. To that end, either a reference point may be approached with functional element 13, or in addition to straightness track 14, 14.1, 14.2, 14', slanting reference marks are used as described in German Published Patent Application No 10 2005 023 984. Such reference marks make it possible to directly read out the instantaneous position of fixed point 15.

What is claimed is:

1. A positioning device in a gantry construction, comprising:
   having two parallel linear guides extending in a first direction, each linear guide supporting an X-traveling carriage in a manner allowing displacement of the X-traveling carriage in the first direction;
   a transverse guide extending in a second direction substantially perpendicular to the first direction, the transverse guide attached to the two X-traveling carriages and supporting a Y-traveling carriage in a manner allowing displacement of the Y-traveling carriage in the second direction;
   a device attached to the Y-traveling carriage and positionable in a working area between the two linear guides and extending in the first direction;
   at least one X-position-measurement device including a scale and an assigned scanning head adapted to determine a position of the transverse guide in the first direction;
   a Y-position-measurement device including a scale and an assigned scanning head adapted to determine a position of the Y-traveling carriage on the transverse guide, the scale of the Y-position-measurement device attached to the transverse guide, the assigned scanning head of the Y-position-measurement device attached to the Y-traveling carriage; and at least one of (a) a real and (b) a virtual scale extending longitudinally in the first direction, having at least one of (a) a real and (b) a virtual straightness track, adapted to measure displacement of the transverse guide in the second direction with the aid of at least one of (a) a real and (b) a virtual scanning head, attached to the transverse guide, to scan the straightness track;

wherein the scale of the Y-position-measurement device is firmly joined to the transverse guide at a fixed point and is otherwise floatingly joined to the transverse guide, with respect to the second direction, the fixed point located perpendicularly offset with respect to the straightness track in terms of the first direction and the second direction, a thermal displacement of the fixed point in the second direction being completely detectable by at least one of (a) the real and (b) the virtual scan of the straightness track.

2. The positioning device according to claim 1, wherein the scale of the Y-position-measurement device is made of a material having a negligible thermal expansion coefficient.

3. The positioning device according to claim 1, wherein the scale of the Y-position-measurement device is made of Zerodur.

4. The positioning device according to claim 1, wherein the virtual scan of the virtual straightness track is provided by a scan of two scales extending longitudinally in the first direction and having a straightness track for measurement of displacement of the transverse guide in the second direction in accordance with scanning heads attached, in each case, to the transverse guide.

5. The positioning device according to claim 4, wherein the thermal displacement of the fixed point is calculatable as a weighted average value from displacements derived from the scanning heads attached to the transverse guide.

6. The positioning device according to claim 1, wherein at least one of (a) the linear guides and (b) the transverse guide includes drives in the form of linear motors.

7. The positioning device according to claim 1, wherein the linear guides include drives in the form of linear motors.

8. The positioning device according to claim 1, wherein the transverse guide includes drives in the form of linear motors.

* * * * *